United States Patent
Yu (10) Patent No.: US 12,401,390 B2
(45) Date of Patent: Aug. 26, 2025

(54) UWB COMPONENT, TERMINAL, AND UWB SYSTEM

(71) Applicant: ZTE CORPORATION, Shenzhen (CN)

(72) Inventor: Bing Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 32 days.

(21) Appl. No.: 18/560,830

(22) PCT Filed: Apr. 24, 2022

(86) PCT No.: PCT/CN2022/088863
§ 371 (c)(1),
(2) Date: Nov. 14, 2023

(87) PCT Pub. No.: WO2022/257623
PCT Pub. Date: Dec. 15, 2022

(65) Prior Publication Data
US 2024/0250713 A1    Jul. 25, 2024

(30) Foreign Application Priority Data
Jun. 7, 2021   (CN) .......... 202110633768.2

(51) Int. Cl.
*H04B 1/00* (2006.01)
*H02J 50/00* (2016.01)
(Continued)

(52) U.S. Cl.
CPC ............ *H04B 1/7163* (2013.01); *H02J 50/00* (2016.02); *H02M 3/02* (2013.01)

(58) Field of Classification Search
CPC .......... H04B 1/7163; H02J 50/00; H02M 3/02
(Continued)

(56) References Cited

U.S. PATENT DOCUMENTS

| 2017/0123039 A1 | 5/2017 | Shin et al. |
| 2018/0123639 A1* | 5/2018 | Muthali ............. H04B 1/71635 |

(Continued)

FOREIGN PATENT DOCUMENTS

| CN | 1777170 A | 5/2006 |
| CN | 210376663 U | 4/2020 |

(Continued)

OTHER PUBLICATIONS

Industrial Property Cooperation Center (IPCC). Search Report for JP Application No. 2023-565616 and English translation, mailed Aug. 16, 2024, pp. 1-23.

(Continued)

*Primary Examiner* — Zewdu A Kassa
(74) *Attorney, Agent, or Firm* — Vivacqua Crane, PLLC (57) ABSTRACT

A UWB component, a terminal and a UWB system are disclosed. The UWB component is arranged externally to a terminal device and deployed as at least one of, a UWB tag or a UWB anchor, the UWB component may include, a first interface module, and a UWB module connected to the first interface module, the first interface module being arranged to be connected with the terminal device; where the first interface module is configured to transfer a transmission between the terminal device and the UWB module, and the transmission may include one or a combination of, a power supply voltage required by the UWB module, a clock signal, or a communication signal.

18 Claims, 6 Drawing Sheets

(51) Int. Cl.
  *H02M 3/02* (2006.01)
  *H04B 1/7163* (2011.01)
(58) Field of Classification Search
  USPC .................................. 375/130, 219, 295, 316
  See application file for complete search history.

(56) References Cited

U.S. PATENT DOCUMENTS

| | | |
|---|---|---|
| 2020/0358469 A1 | 11/2020 | Oh et al. |
| 2021/0266746 A1* | 8/2021 | Antolinos ............. H04W 4/029 |
| 2024/0402836 A1* | 12/2024 | Xue ........................ G06F 3/038 |

FOREIGN PATENT DOCUMENTS

| | | |
|---|---|---|
| CN | 111491536 A | 8/2020 |
| JP | 2001051749 A | 2/2001 |
| JP | 2008042793 A | 2/2008 |
| JP | 2009267844 A | 11/2009 |
| JP | 2010175374 A | 8/2010 |
| JP | 2011520413 A | 7/2011 |
| JP | 2012147396 A | 8/2012 |
| JP | 2016027445 A | 2/2016 |
| WO | 2020157235 A1 | 8/2020 |

OTHER PUBLICATIONS

Japan Patent Office. Notice of Reasons for Refusal for JP Application No. 2023-565616 and English translation, mailed Sep. 2, 2024, pp. 1-10.
International Searching Authority. International Search Report and Written Opinion for PCT Application No. PCT/CN2022/088863 and English translation, mailed Jun. 17, 2022, pp. 1-10.
European Patent Office. Extended European Search Report for EP Application No. 22819225.8, mailed Oct. 15, 2024, pp. 1-9.
Japan Patent Office. Second Notice of Reasons for Refusal for JP Application No. 2023-565616 and English translation, mailed Mar. 3, 2025, pp. 1-10.

* cited by examiner

UWB COMPONENT, TERMINAL, AND UWB SYSTEM

CROSS-REFERENCE TO RELATED APPLICATION

This application is a national stage filing under 35 U.S.C. § 371 of international application number PCT/CN2022/088863, filed Apr. 24, 2022, which claims priority to Chinese patent application 202110633768.2 filed Jun. 7, 2021. The contents of these applications are incorporated herein by reference in their entirety.

TECHNICAL FIELD

The present disclosure relates to the technical field of communication, in particular to a UWB component, a terminal device, and a UWB system.

BACKGROUND

From the perspective of the development of mobile phones, users are demanding higher and higher user experience with the unchanged demand for miniaturization and thinness, while the basic functionalities of mobile phones are increasing. From the fourth-generation mobile communication technique (4G) to the fifth-generation mobile communication technique (5G), more RF bands are provided, more devices are provided, and the complexity of the circuit boards is increasing dramatically. Meanwhile, the increasing demand for better imaging of the phone camera and the fast charging would pose more and more challenges to the design of the circuit board, and the space is getting smaller and smaller.

At present, the ultra-wide band (UWB) technique is still in the early stage of development. The UWB-based products now are indoor positioning systems based on fixed anchors. Most of the products are used in huge industrial equipment or by workers. The employment of the UWB technique into terminal devices such as small mobile phones, will increase the number of devices on the circuit board of mobile phones. Those large numbers of devices and the antenna(s) will have a large footprint, thus increasing the risk of antenna interference.

SUMMARY

Provided are a UWB component, a terminal device, and a UWB system in some embodiments of the present disclosure.

An embodiment of the present disclosure provides an ultra-wideband (UWB) assembly, arranged externally to a terminal device and deployed as at least one of, a UWB tag or a UWB anchor, the UWB component may include, a first interface module, and a UWB module connected to the first interface module configured to be connected with the terminal device; where the first interface module is configured to transfer a transmission between the terminal device and the UWB module, and the transmission may include one or a combination of, a power supply voltage required by the UWB module, a clock signal, or a communication signal.

An embodiment of the present disclosure provides a terminal device, which is arranged external to the UWB component as described above, the terminal device may include, a second interface module, arranged to be connected with the UWB component, and a UWB support module that is connected with the second interface module; where the second interface module is configured to transfer a transmission between the UWB support module and the UWB component, and the transmission includes one or a combination of, a power supply voltage required by the UWB module, a clock signal, or a communication signal.

An embodiment of the present disclosure provides a UWB system, which may include the UWB component and the terminal device as described above.

DETAILED DESCRIPTION

Various embodiments of the present disclosure will be described in detail below in conjunction with the drawings to illustrate the purpose, technical scheme and advantages of the present disclosure. However, it shall be appreciated by those having ordinary skill in the art that many technical details are put forward in order to clarify the present disclosure. However, the technical solutions claimed in the present disclosure can be practiced even without these technical details and various alternations and modifications based on the following embodiments. The following embodiments are divided for the convenience of description, and should not constitute any limitation on the implementation of the present disclosure. The embodiments can be combined with and based on each other without conflict.

Related art to some embodiments of the present disclosure is introduced first for a better understanding.

Ultra-wideband (UWB) technique is a wireless carrier communication technique. Different from the existing narrowband communication technology, UWB technology realizes wireless transmission by sending and receiving ultra-narrow pulses at the nanosecond level. The time width of a UWB pulse is extremely short and is within 2 ns, and the rising and falling edges are very fast. Even in a noisy environment, the rising and falling edges are still clear, so the UWB pulse exhibits strong anti-noise ability. According to the Fourier transform theorem, the shorter the time-domain pulse is, the wider the frequency spectrum is, and the available bandwidth for UWB is above 500 MHz. With ultra-wide bandwidth, the power of a UWB pulse is still relatively low, so the power spectral density is very low, the signal strength is far lower than noise, and the UWB pulse exhibits excellent secrecy and security. UWB technique has a good development prospect in indoor high-precision positioning and vehicle networking.

The United States Federal Communications Commission (FCC) allocates a total of 7.5 GHz bands from 3.1 GHz to 10.6 GHz for UWB. At present, the frequency of channel 5 is at 6.5 GHz, so the design of a half-wavelength antenna requires that the distance between two antennas is about 2.3 cm, while the frequency of channel 9 is at 8.0 GHz, so the design of a half-wavelength antenna requires that the distance between two antennas is about 1.9 cm. When the UWB module is arranged onto the terminal device, the UWB module should not only have the functionalities as a UWB tag, but also have the functionalities as a UWB anchor. Therefore, the design of UWB requires multi-antenna technology, and the fixed-distance half-wavelength antenna will substantially occupy the design space of the circuit board, even in a narrow space, the UWB antenna will interfere with 5G and Wi-Fi antennas. At the same time, the UWB chip in the UWB module needs to integrate a baseband controller, RF front-end circuit, even Microcontroller Unit (MCU) that operates independently and Bluetooth module to form a communication system. In addition, an independent power supply and clock unit are required to provide power and clock, which provides a complete technical solution for realizing the supporting functionalities of UWB technology. From the perspective of the antenna and its clearance area, as well as device layout area, terminal devices such as mobile phones require a considerable amount of circuit board space to achieve UWB technology. However, the layout of a circuit board in mobile phones is constrained by the limited space due to a large number of integrated devices, such that it is an issue to make room for appropriate layout for UWB modules and the antenna within the circuit board. At present, the UWB technique is still in the early stage of development. The UWB-based products now are indoor positioning systems based on fixed anchors. Most of the products are used in huge industrial equipment or by workers. The employment of the UWB technique into terminal devices such as small mobile phones, will increase the number of devices on the circuit board of mobile phones. Those large numbers of devices and the antenna(s) will have a large footprint, thus increasing the risk of antenna interference.

In order to at least alleviate the above problems, an embodiment of the present disclosure provides an ultra-wideband (UWB) assembly, arranged externally to a terminal device and deployed as at least one of, a UWB tag or a UWB anchor, the UWB component includes, a first interface module, and a UWB module connected to the first interface module that is configured to be connected with the terminal device; where the first interface module is configured to transfer a transmission between the terminal device and the UWB module, and the transmission includes one of, a power supply voltage required by the UWB module, a clock signal, or a communication signal, or a combination thereof. The UWB component can include, all devices for realizing UWB functionalities or part of devices for realizing UWB functionalities. That is to say, all or part of the devices for realizing UWB functionalities are arranged external to the terminal device, with the transmission such as the power supply voltage, communication signals and clock signals transferred through the first interface module. Due to the arrangement of all or part of the devices for realizing UWB functionalities external to the terminal device, the large footprint of the devices on the circuit board of the terminal device and the antennas can be addressed, and the mutual interference between antennas can be reduced. As a result, some high-end terminal devices with complex functions are allowed to be integrated with UWB functionalities, and the necessity for compromising some other functionalities for integration with the UWB functionalities is thus eliminated. At the same time, UWB component arranged external to the terminal device can allow easier upgrading and replacement of UWB component. In addition, according to the trend in the industry that the peripheral ecological products on terminal devices are successively enriching, UWB assemblies external to terminal devices can provide customers with a better user experience and more choices.

Figure 1:
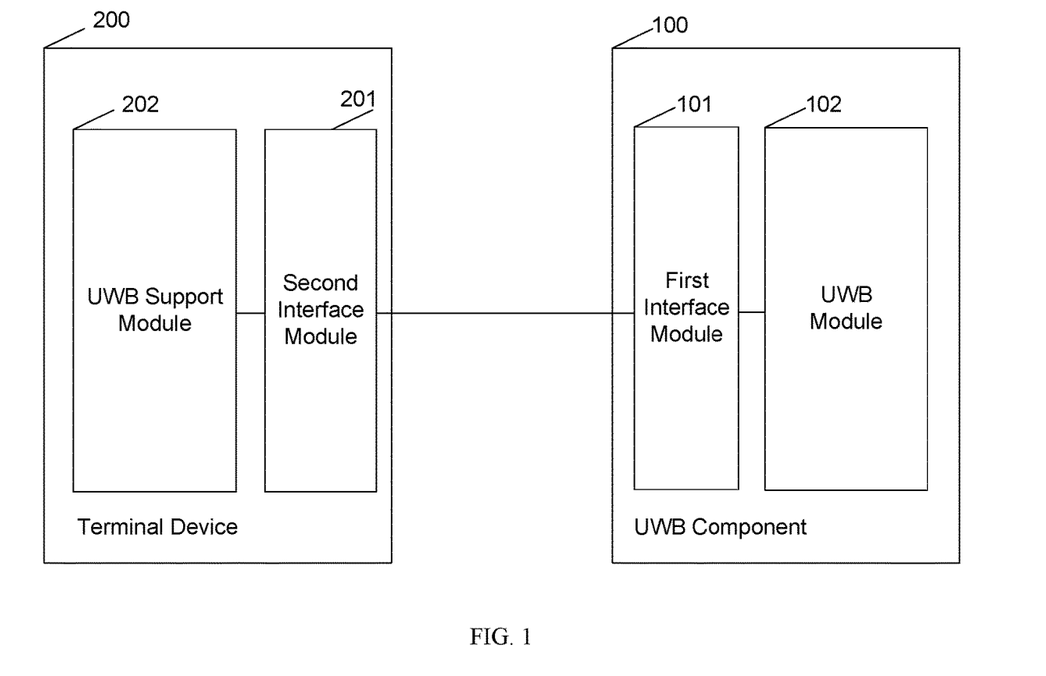
FIG. 1 depicts a schematic diagram showing a UWB component according to an embodiment of the present disclosure.

FIG. 1 depicts a schematic diagram showing a UWB component according to an embodiment. As shown, the UWB component includes a first interface module 101 and a UWB module 102. The UWB module 102 is connected to the first interface module 101 that is configured to be connected to a terminal device 200. For example, the first interface module 101 can be connected to a second interface module 201 arranged within the terminal device 200. Transmissions between the terminal device 200 and the UWB module 102 can be achieved via the connection between the first interface module 101 and the second interface module 201, including any one or a combination of the following: power supply voltage, communication signal, or clock signal.

The UWB component can include, all devices for realizing UWB functionalities or part of devices for realizing UWB functionalities. If the UWB component includes part of the devices that realize the UWB functionalities, the rest of the devices that realize the UWB functionalities can be arranged in the terminal device. That is, all devices that realize the UWB functionalities are distributively arranged across the terminal device and the UWB component. The terminal device can be a mobile phone, a smartwatch, a smart bracelet, etc.

The UWB module 102 may include any one or a combination of, a UWB chip, a UWB antenna unit, an MCU, a Bluetooth communication unit, a Bluetooth antenna unit, a clock unit, or a battery unit. The UWB antenna unit can be configured to receive or transmit UWB signals. The UWB chip can include baseband and RF circuits related to modulation and demodulation. The baseband and RF circuits can be configured to modulate and demodulate UWB signals. MCU can be configured to process UWB signals or perform other necessary control operations. The Bluetooth communication unit can be a Bluetooth chip, which is configured to perform communication with the terminal device via Bluetooth. For example, the Bluetooth communication unit is responsible for sending the demodulated UWB signal to the processing unit within the terminal device 200. It can be understood that the Bluetooth communication unit is not necessary if the UWB component and the terminal device are wired. The Bluetooth antenna unit can be configured to cooperate with the Bluetooth communication unit to send and receive signals. The clock unit can be a clock generator, which can be configured to generate clock signals as required by the UWB component. The battery unit can be configured to supply power to the electrically powered units within the UWB module. The electrically powered units may include, the UWB chip, MCU, Bluetooth communication unit, or the like. The fewer components in the UWB module, the easier the design. The more components in the UWB module, the smaller the space occupied on the circuit board of the terminal device, and the smaller the impact on antenna interference.

According to the practical requirements, the UWB chip can also be integrated with an MCU and a Bluetooth communication unit, so that the UWB chip can also realize the functions of an MCU and Bluetooth communication unit. However, in this embodiment, the functional units integrated into the UWB chip are not specifically limited. In an implementation, other devices besides the baseband and RF circuits, MCU and Bluetooth communication units can be integrated into the UWB chip, depending upon practical requirements.

In an embodiment, the UWB antenna (one of the devices for realizing the UWB function) can be arranged external to the terminal device. That is, the UWB component includes the UWB antenna, which can alleviate the interference between the UWB antenna and the 5G antenna, Wi-Fi antenna, and the like arranged on the circuit board of the terminal device, and reduce the difficulty in antenna testing. However, in an implementation, the UWB antenna can also be arranged within the terminal device, and this embodiment is not limited thereto.

In an example, a UWB component can be deployed as a UWB tag to achieve the functionalities of a UWB tag. A UWB tag can have the following functionalities. The UWB tag can transmit signals to a surrounding UWB anchor so that the UWB anchor can know the relative position coordinate of the UWB tag. Alternatively, the UWB tag communicates with the UWB anchor to inform the UWB anchor of the following information: the absolute distance between the UWB tag and the UWB anchor, or the relative angle and orientation of the UWB tag with respect to the UWB anchor. The UWB tag can also transmit useful information to the UWB anchor through the UWB tag itself or through other associated secondary communication channels, but this embodiment does not particularly limit the useful information transmitted by the UWB tag to the UWB anchor. When the UWB component is deployed as a UWB tag, the UWB component belongs to a passive searching device, and does not have to communicate with the terminal device. That is to say, when the UWB component is deployed as a UWB tag, the first interface module 101 does not have to transmit the communication signal between the terminal device 200 and the UWB module 102. In an implementation, when the UWB component is deployed as a UWB tag, the UWB antenna unit can be a single antenna. The manufacturing cost of UWB component is lower, when UWB component is deployed as a UWB tag.

In an example, the UWB component can be deployed as a UWB anchor to achieve functionalities of the UWB anchor. A UWB anchor can have the following functionalities. The UWB anchor can receive a plurality group of signals from various UWB tags, and calculates based on the plurality groups of signals, the absolute distance, the relative angle and orientation, and the relative coordinate of the UWB anchor with respect to a respective one of the UWB tags. The UWB anchor can also receive or transmit useful information through the UWB anchor itself or through other associated secondary communication channels, but this embodiment does not particularly limit the useful information transmitted or received by the UWB anchor. When the UWB component is deployed as a UWB anchor, a communication signal is transmitted between the UWB component and the terminal device. The first interface module 101 can be configured to transmit the UWB signal obtained when the UWB component is deployed as a UWB anchor to the terminal device for further processing, or directly transmit the same to the terminal device for display. In an implementation, when the UWB component is deployed as a UWB anchor, the UWB antenna unit can have a plurality of antennas.

In an example, the UWB component can be deployed as both a UWB tag and a UWB anchor. That is, the UWB component has both the functionalities of a UWB tag and a UWB anchor. In this case, the UWB antenna unit can have a plurality of antennas.

In an example, the UWB component and the terminal device can be wired. The first interface module in the UWB component can be a serial interface or a parallel communication interface such as a Serial Peripheral Interface (SPI), a Universal Serial Bus (USB) Interface, Universal Asynchronous Receiver/Transmitter (UART), and can also be a General-purpose input/output (GPIO). The second interface module in the terminal device can also be a serial interface or a parallel communication interface such as SPI, USB and UART, and can also be a GPIO.

In another example, the UWB component and the terminal device can be wirelessly connected. One or both of, the first interface module in the UWB component, or the second interface module in the terminal device can be a radio air interface. In an implementation, the wireless connection between the UWB component and terminal device can be a Bluetooth connection, 4G connection, 5G connection, a Wi-Fi connection, etc. In an example, the terminal device is a mobile phone carried by a user. The UWB component can be attached to the mobile phone, or the UWB component can be arranged in a key chain or another object carried by the user, so that the mobile phone and the UWB component can establish a short-range wireless connection. For example, the mobile phone and the UWB component can be paired and connected via Bluetooth.

In an embodiment, the UWB module includes an electrically powered unit, such as a UWB chip, MCU, Bluetooth chip, or other devices that are electrically powered. The power supply of the electrically powered unit can be done in two forms. One is the subsystem with a battery. That is, the UWB module is provided with a battery unit therein. And the other is the subsystem without battery and thus an external power supply is needed. That is, the UWB module is not provided with a battery unit therein. The two forms discussed above will be illustrated respectively below.

When the UWB module is not provided with a battery unit therein, the transmission transferred between the terminal device and the UWB component includes the power supply voltage.

The electrically powered unit is powered by a post-stage power supply unit which can be a post-stage power supply unit led out from the battery of the terminal device. For example, the electrically powered unit includes a UWB chip that typically requires a voltage of 1.8V, 1.2V, 2.8V, 3V, or the like. Thus, the power can be directly or indirectly supplied to the UWB chip through the battery of the terminal device. Power supply through the post-stage power supply unit can have the following three implementations.

Figure 2:
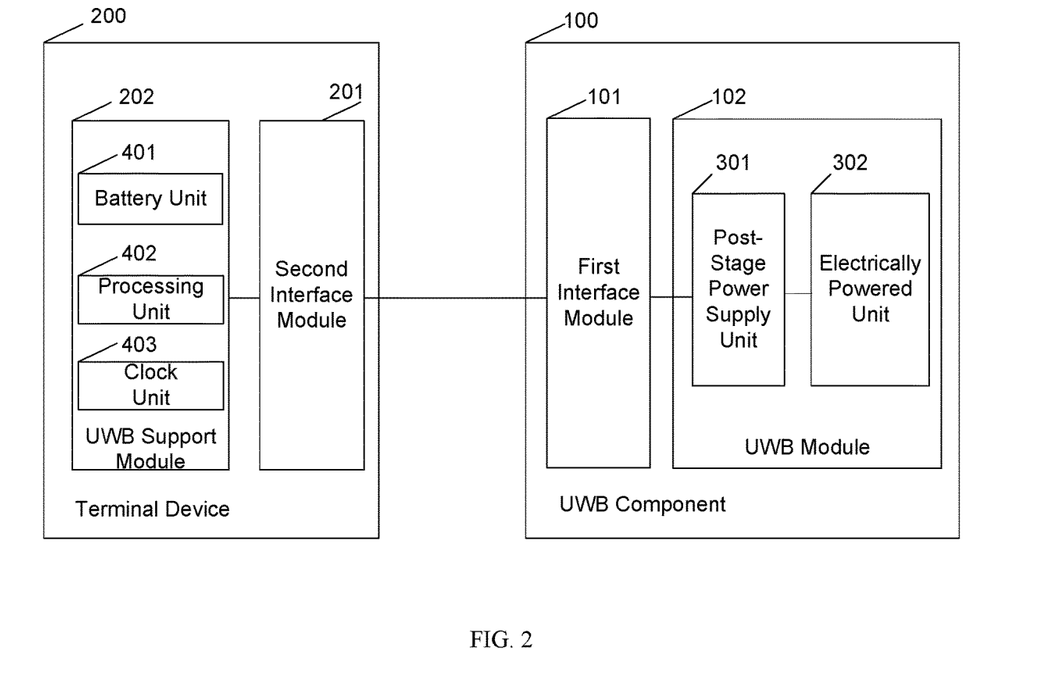
FIG. 2 depicts a schematic diagram showing a UWB component when the post-stage power supply unit is in implementation one according to an embodiment of the present disclosure.

Implementation One: Referring to FIG. 2, the post-stage power supply unit 301 is arranged within the UWB component 100. The first interface module 101 is connected with the post-stage power supply unit 301. The first interface module 101 is configured to transmit a power supply voltage of the terminal device 200 to the post-stage power supply unit 301. The post-stage power supply unit 301 is configured to regulate the power supply voltage and supply power to the electrically powered unit 302 by means of the regulated power supply voltage. In particular, the power supply voltage of the terminal device 200 can be provided by the battery unit 401 in the UWB support module. That is, the power supply voltage provided by the battery unit 401 in the terminal device 200 reaches the post-stage power supply unit 301 through the second interface module 201 and the first interface module 101. As such, the post-stage power supply unit 301 can regulate the power supply voltage and supply the electrically powered unit 302 with the regulated power supply voltage. In some embodiments, the post-stage power supply unit 301 may include post-stage power supplies such as a direct current-direct current (DC-DC) and/or a low dropout regulator (LDO).

Figure 3:
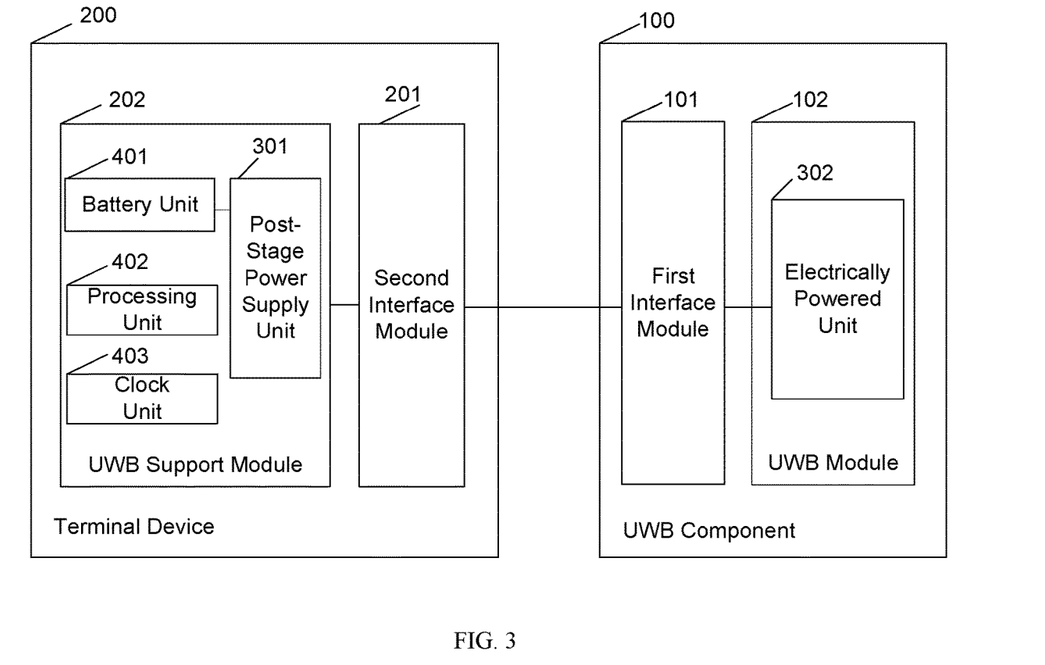
FIG. 3 depicts a schematic diagram showing a UWB component when the post-stage power supply unit is in implementation two according to an embodiment of the present disclosure.

Implementation Two: Referring to FIG. 3, the post-stage power supply unit 301 is arranged within the terminal device 200. The first interface module 101 is configured to transmit the regulated power supply voltage from the post-stage power supply unit 301 within the terminal device 200 to the electrically powered unit 302, so as to supply power to the electrically powered unit 302. In this way, the terminal device can directly provide a plurality way of power supplies needed by the electrically powered unit 302. For example, the power supply voltage provided by the battery unit 401 in the terminal device 200 is regulated by the post-stage power supply unit 301 such as a DC-DC or an LDO, and then reaches the electrically powered unit 302 through the second interface module 201 and the first interface module 101, such that the electrically powered unit 302 is energized. The LDO discussed here operates in step-down, i.e., the step-down regulation, while the DC-DC can operate in step-down, step-up, or a combination of step-down and step-up. The post-stage power supply unit is arranged in the terminal device. The first interface module directly transmits the regulated power supply voltage from the post-stage power supply unit in the terminal device to the electrically powered unit. As a result, the number of devices in the UWB component is reduced while the power supply to the electrically powered unit is realized, which is beneficial to reducing the manufacturing cost and design difficulty of the UWB component.

Figure 4:
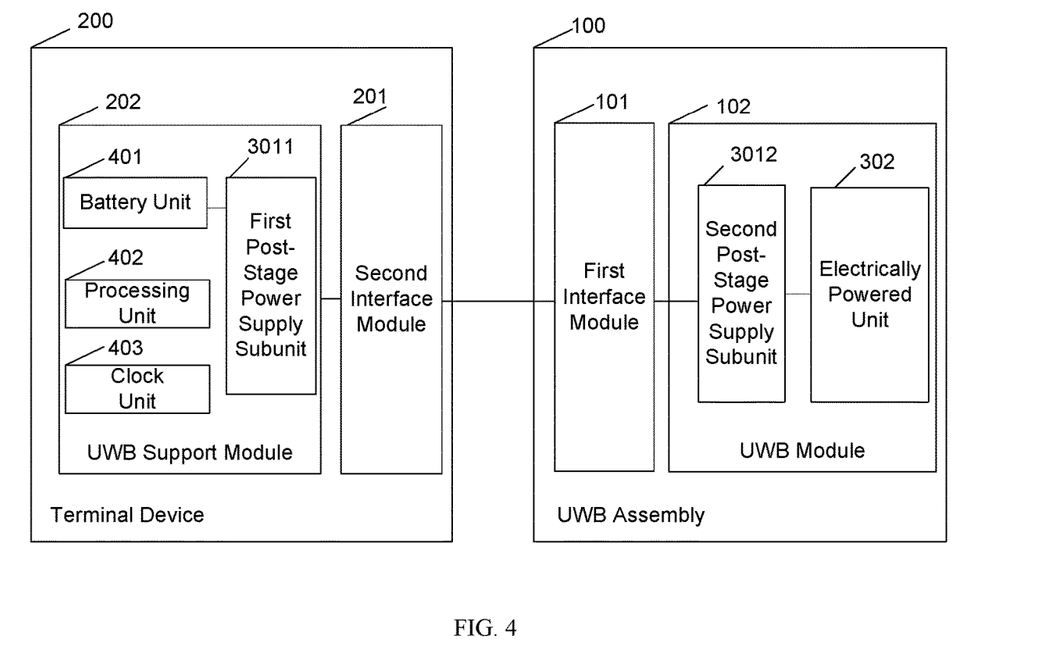
FIG. 4 depicts a schematic diagram showing a UWB component when the post-stage power supply unit is in implementation three according to an embodiment of the present disclosure.

Implementation Three: Referring to FIG. 4, the post-stage power supply unit supplies power to the electrically powered unit via the On-The-Go (OTG) connection of the terminal device. This implementation is mainly applied to the connection between different devices or mobile devices for data transfer. The post-stage power supply unit includes a first post-stage power supply subunit 3011 arranged within the terminal device 200, and a second post-stage power supply subunit 3012 arranged within the UWB component 100. The first interface module 101 is configured to transmit a step-up power supply voltage that is regulated by the first post-stage power supply subunit 3011 to the second post-stage power supply subunit 3012. The second post-stage power supply subunit 3012 is configured to step-down and regulate the step-up and regulated power supply voltage, and supply power to the electrically powered unit 302 through step-down and regulated power supply voltage. That is to say, the post-stage power supply unit can supply power via the OTG connection provided by the terminal device. For example, the existing USB interface of the terminal device is utilized as the second interface module in the terminal device. In this case, the post-stage power supply unit includes a first post-stage power supply subunit 3011 arranged in the terminal device 200, which is a step-up part, and a second post-stage power supply subunit 3012 arranged within the UWB component 100, which is a step-down part. That is, the terminal device can supply power to the electrically powered unit 302 in the UWB component through an OTG connection.

The above three implementation methods can realize the power supply to the electrically powered unit without the need for the UWB component to bring its own battery unit, which is conducive to reducing the cost and design difficulty of the UWB component.

Figure 5:
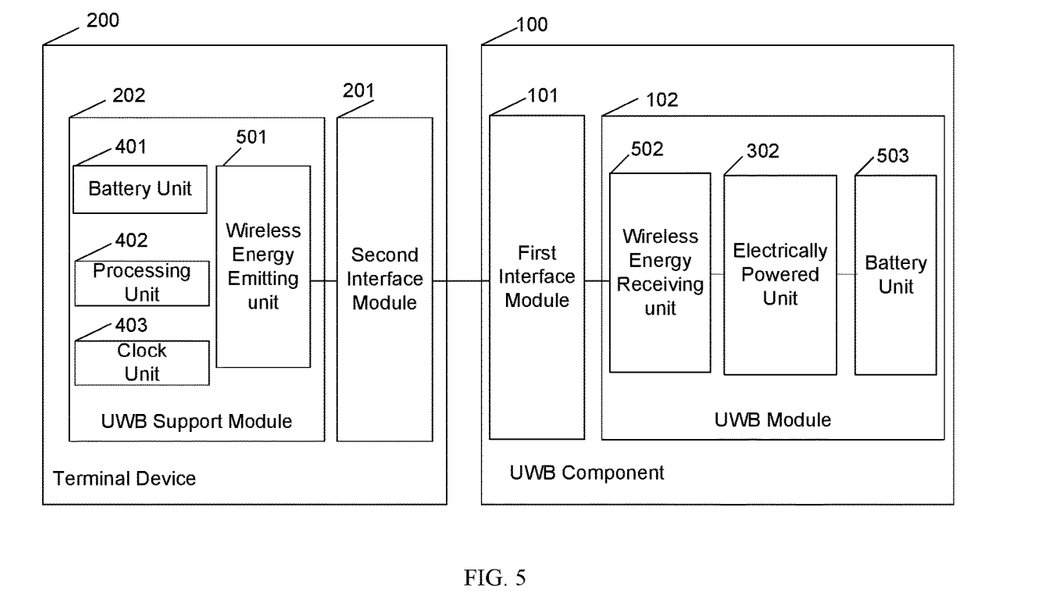
FIG. 5 depicts a schematic diagram showing a UWB component with a battery unit according to an embodiment of the present disclosure.

When the UWB module itself has a battery unit, the electrically powered unit can supply power through the battery unit in the UWB component. For example, the battery unit in the UWB module can directly supply power to the UWB chip without an external power supply. In view of the consideration that the power supply capacity of the battery unit in the UWB module may not be large, the terminal device and UWB module can be respectively equipped with a wireless energy emitting unit and a wireless energy receiving unit. Referring to FIG. 5, the UWB module contains therein a battery unit 503 to supply power to the electrically powered unit 302. The UWB component 100 also includes a wireless energy receiving unit 502 connected with the electrically powered unit 302. The transmission transferred between the terminal device 200 and the UWB module 102 further includes wireless energy. The first interface module 101 is configured to transmit the wireless energy from the wireless energy emitting unit 501 in the terminal device 200 to the wireless energy receiving unit 502. The wireless energy receiving unit 502 is configured to charge the electrically powered unit 302 with the received wireless energy, which is beneficial to achieve the indirect and continuous power supply.

In an embodiment, the UWB module includes a clock unit that can provide clock signals required by the UWB module. The clock unit in the UWB module can be a clock generator. For example, the clock generator can directly provide the clock to the UWB chip in the UWB module. In this case, the first interface module has no clock signal, that is, the clock signal will not be transmitted between the terminal device and the UWB component.

In an embodiment, the UWB module does not contain a clock unit therein. The transmission transferred between the terminal device and the UWB module by the first interface module includes a clock signal. That is, the clock signal required by the UWB module is provided by the terminal device. The clock signal comes from the clock generator in the terminal device, or from the system clock in the terminal device. The clock generator in the terminal device can be an independent clock generator in a mobile phone, for example. The system clock can be provided for example, by the smallest system of the mobile phone. The clock signal required by the UWB component comes from the terminal device, which eliminates the need for a clock unit in the UWB component, thus reducing the design cost and difficulty of UWB components.

In an embodiment, the transmission transferred between the terminal device and the UWB module by the first interface module includes communication signals, which are intended for data interaction and control. The communication signal, when it is intended for data interaction, can also be called an interactive communication signal. The interactive communication signal can be a UWB signal transmitted between the processing unit in the terminal device (refer to FIGS. 1-5) and the UWB module in the UWB component, when the UWB component is deployed as a UWB anchor. The communication signal, when it is used for control, can also be called the control communication signal which can be simply called the control signal. The control signal is intended to control the UWB module. For example, the control signal may include any one or a combination of a Reset signal for controlling restart, an enable signal for controlling opening or closing, or a signal for controlling transition to a sleep mode.

In an embodiment, the UWB module includes a UWB chip and an MCU that is connected with the UWB chip. The MCU is configured to convert output data from the UWB chip into standardized data meeting a preset standard, and transmit the standardized data to the terminal device through the first interface module. The output data of the UWB chip can be understood as a UWB signal which in turn can be understood as the interactive communication signal discussed above. The preset standard can be set according to the practical requirements. For example, the preset standard can be set as a standard that different types of terminal devices follow. The output data of the UWB chip is converted into standardized data, so that different terminal devices can easily identify and process the standardized data after receiving the data. As such, the UWB component can cooperate with more types of terminal devices thus improving the universality and adaptability of UWB component.

It is worth mentioning that, in order to highlight the innovative part of the present disclosure, the unit that is not closely related to solving the technical problems raised in the present disclosure is not introduced in this embodiment, but this does not mean that there are no other units in the UWB component of this embodiment.

An embodiment of the present disclosure provides a terminal device, which is provided externally to the UWB component in any of the above embodiments. The schematic diagram of the terminal device can refer to the terminal device 200 as shown in any one of FIGS. 1 to 5. For example, referring to FIG. 1, the terminal device 200 includes a second interface module 201 and a UWB support module 202 that is connected to the second interface module 201. The second interface module 201 is configured to connect to the UWB component 100, for example, the first interface module 101 within the UWB component 100. The second interface module 201 is configured to transfer a transmission between the UWB support module 202 and the UWB component 100, the transmission includes any one or a combination of, power supply voltage, communication signal, or clock signal. The UWB support module 202 can be understood as a module arranged in the terminal device for cooperating with an external UWB component to realize UWB functionalities.

In an embodiment, the second interface module 201 is configured to transfer a transmission between the UWB support module 202 and the UWB component 100, including the power supply voltage. That is, the transmission transferred between the second interface module 201 and the first interface module 101 includes the power supply voltage. Referring to FIGS. 2 to 5, the power supply voltage can be provided by the battery unit 401 in the UWB support module 202. The battery unit 401 can be connected with the second interface module 201, such that the power supply voltage is transmitted to UWB component 100 through the second interface module 201. The battery unit 401 can be a battery within the terminal device.

In an embodiment, the second interface module 201 is configured to transfer a transmission between the UWB support module 202 and the UWB component 100, the transmission includes the communication signals. That is, the transmission transferred between the second interface module 201 and the first interface module 101 includes the communication signals. Referring to FIGS. 2 to 5, the communication signals can be provided by the processing unit 402 in the UWB support module 202. The processing unit 402 can be connected with the second interface module 201, such that the communication signals are transmitted to UWB component 100 through the second interface module 201. The UWB component 100 can also transmit the desired communication signals to the terminal device 200, to the processing unit 402 through the second interface module 201. The processing unit can be a processor arranged within the terminal device.

In an embodiment, the second interface module 201 is configured to transfer a transmission between the UWB support module 202 and the UWB component 100, the transmission includes a clock signal. That is, the transmission content between the second interface module 201 and the first interface module 101 includes the clock signal. Referring to FIGS. 2 to 5, the clock signal can be provided by the clock unit 403 in the UWB support module 202. The clock unit 403 can be connected with the second interface module 201, such that the clock signal is transmitted to UWB component 100 through the second interface module 201. The clock unit 403 may be a clock generator or a system clock of the smallest system of the terminal device.

In an embodiment, the second interface module 201 is configured to transfer a transmission including wireless energy between the UWB support module 202 and the UWB component 100. Referring to FIG. 5, the UWB support module 202 includes a wireless energy emitting unit 501 that is connected with the second interface module 201. The second interface module 201 is configured to transmit the wireless energy emitted by the wireless energy emitting unit 501 to the wireless energy receiving unit 502 in the UWB component 100. The wireless energy receiving unit 502 is configured to charge the electrically powered unit 302 in the UWB component 100 with the received wireless energy.

It is worth mentioning that, in order to highlight the innovative part of the present disclosure, the unit that is not closely related to solving the technical problems raised in the present disclosure is not introduced in this embodiment, but this does not mean that no additional units are provided in the terminal device in this embodiment.

It is clear that the terminal device described in this embodiment can be implemented in cooperation with the UWB component described in any of the above embodiments. The related technical details and technical effects described in the embodiment(s) involving the UWB component are still applicable to the embodiment(s) involving the terminal device, so which will not be repeated here in order to reduce redundancy. Accordingly, the relevant technical details of the terminal device described in this embodiment can also be applied to the above-described embodiment involving UWB component.

An embodiment of the present disclosure provides a UWB system, which include the UWB component and the terminal device described in any of the above embodiments. In this embodiment, the UWB system can have several implementations, which will be illustrated below.

FIG. 6 to FIG. 12 respectively depict implementations one to seven. It should be noted that the interface unit A in FIGS. 6 to 12 can be interpreted as the second interface module in the above-described embodiment(s) involving the terminal device, and the interface unit B can be interpreted as the first interface module in the above-described embodiment(s) involving the UWB component. FIGS. 6 to 12 are intended to illustrate the transmission transferred between interface unit A and interface unit B, so other functional units are omitted, which does not mean that no additional functional units are provided in the UWB component 601 and the terminal device 602.

The following describes several implementations of the UWB system from three aspects: the power supply, the clock signal, and the communication signal.

The power supply voltage can have several implementations.

In an embodiment, no battery unit is provided in the UWB component, and thus the terminal device has to supply power to the electrically powered unit in the UWB component. The electrically powered unit is illustrated as a UWB chip by way of example. The required power supply voltage for a UWB chip is typically 1.8V, 1.2V, 2.8V, 3V, or the like. Thus, power can be directly or indirectly supplied through a battery of the terminal device to the UWB chip. The power supply can be done in the following methods.

Method A: The battery of the terminal device supplies power. In this case, a post-stage power module is arranged within the UWB component, which is a post-stage power supply such as DC-DC or LDO, and is connected to the UWB chip to supply power to the UWB chip. For example, refer to FIG. 6 to FIG. 8, the UWB chip in the UWB component is powered by the battery in the terminal device and the post-stage power module arranged in the UWB component.

Method B: The terminal device directly provides the multi-way power supply required by the electrically powered unit (such as the UWB chip) in the UWB component. In this case, a post-stage power supply module is arranged onto the terminal device. The supply power voltage is regulated by the post-stage power supply such as DC-DC or LDO, and the regulated power supply voltage is then transmitted by the interface units A and B. The interface unit B is connected to the UWB chip that is powered by the regulated power supply voltage. For example, refer to FIG. 6 to FIG. 8, the UWB chip in the UWB component is powered by the battery in the terminal device and the post-stage power module arranged in the terminal device. The LDO discussed here operates in step-down, while the DC-DC can operate in step-down, step-up, or a combination of step-down and step-up.

Method C: The OTG connection provided by the terminal device is utilized to supply power, such as using the existing USB interface as the interface unit A. In this case, the post-stage power supply module includes a step-up part arranged within the terminal device and a step-down part arranged within the UWB component. For example, refer to FIG. 9 and FIG. 10, the UWB chip in the UWB component is powered via the OTG connection provided by the terminal device. The step-up part can be understood as the first post-stage power supply unit shown in FIG. 4, and the step-down part can be understood as the second post-stage power supply unit shown in FIG. 4.

In an embodiment, a battery unit is provided within the UWB component, thus eliminating an external power source. However, due to the low capacity of the battery, the user may experience problems such as short battery life or inconvenient battery replacement. As a result, the terminal device and UWB component can be equipped with a wireless energy emitting unit and wireless energy receiving unit respectively, so as to achieve an indirect and continuous power supply. For example, refer to FIG. 11 and FIG. 12, which show the UWB chip in the UWB component can be powered wirelessly.

The clock signal can have several implementations.

Figure 6:
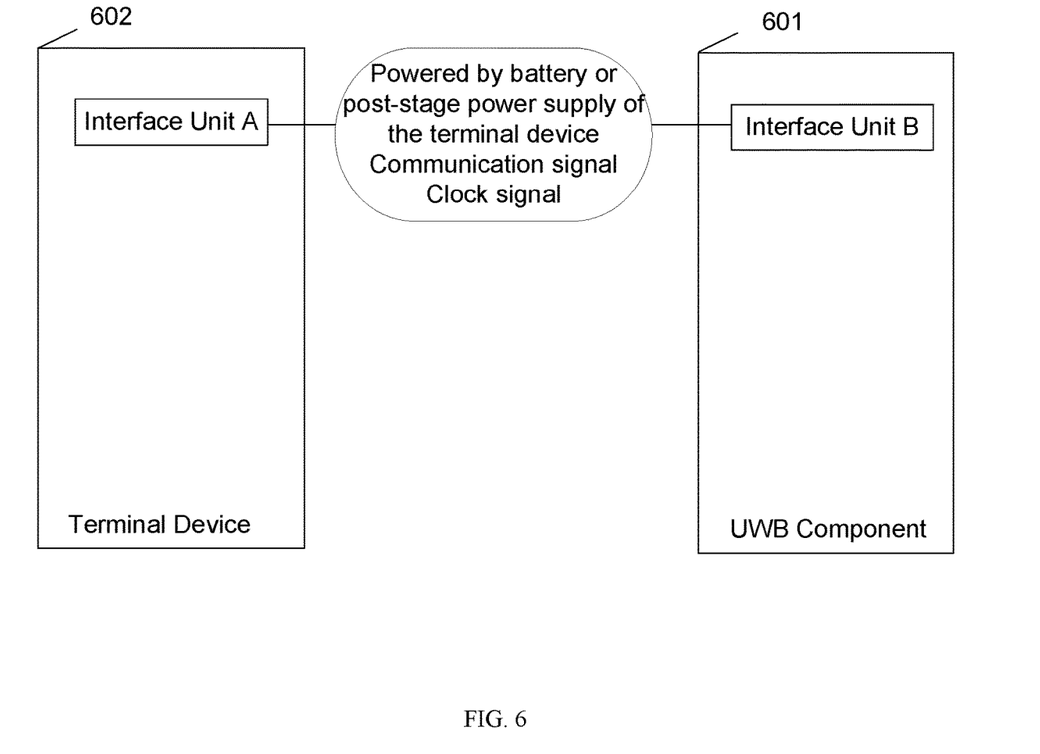
FIG. 6 depicts a schematic diagram showing a UWB system in implementation one according to an embodiment of the present disclosure.
Figure 7:
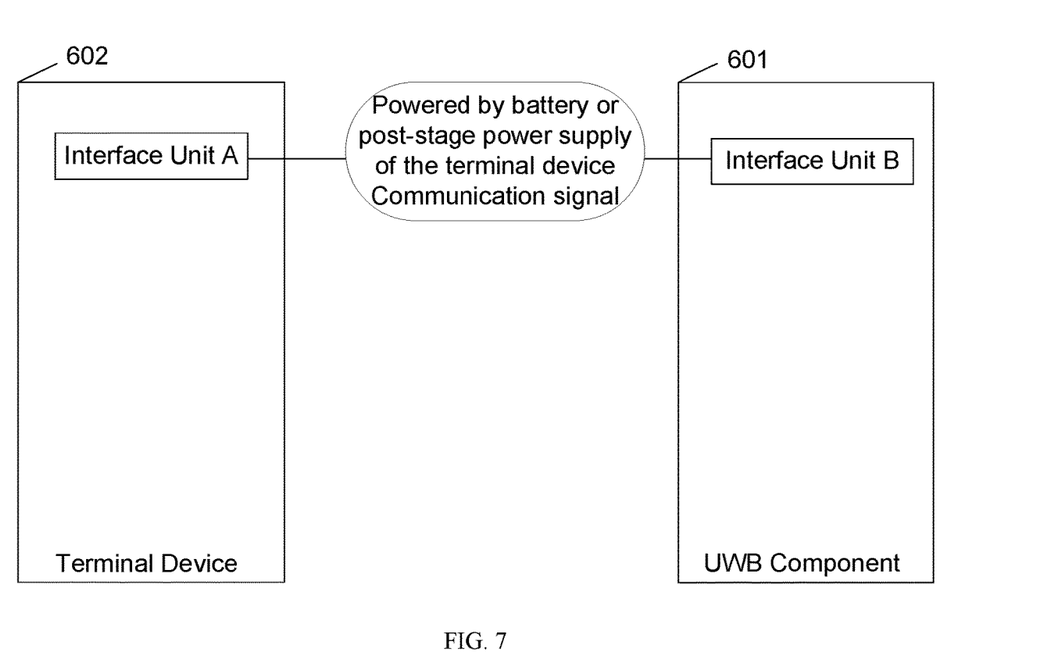
FIG. 7 depicts a schematic diagram showing a UWB system in implementation two according to an embodiment of the present disclosure.
Figure 8:
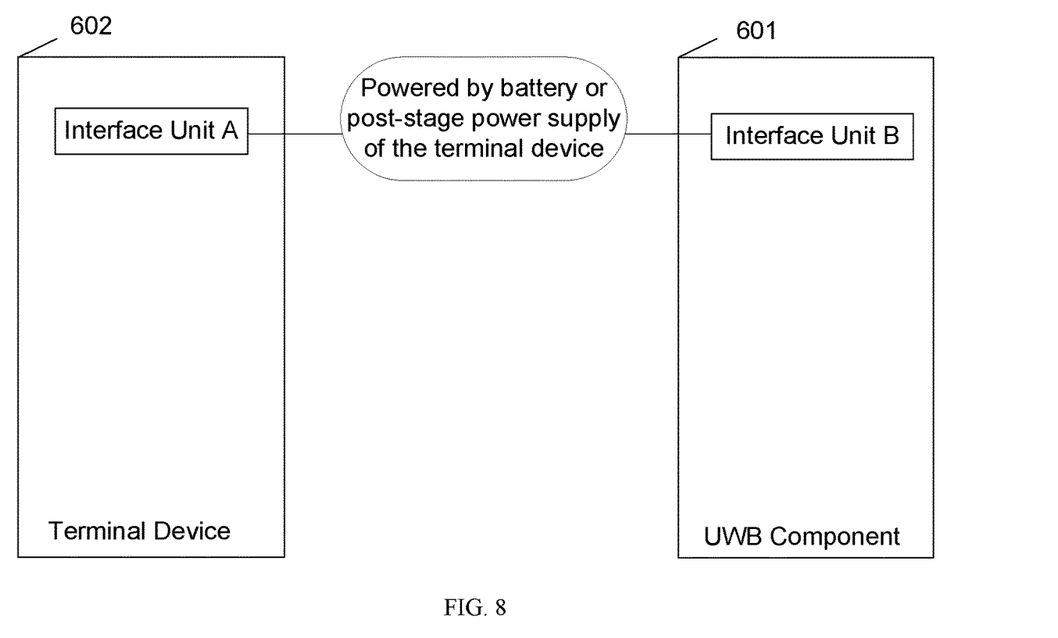
FIG. 8 depicts a schematic diagram showing a UWB system in implementation three according to an embodiment of the present disclosure.
Figure 9:
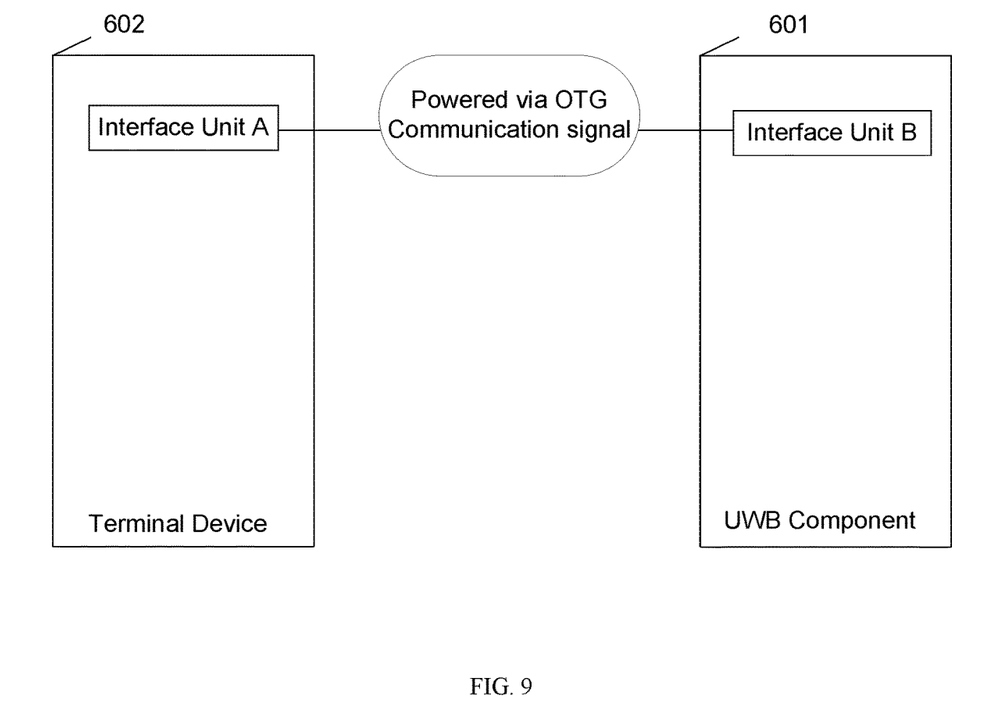
FIG. 9 depicts a schematic diagram showing a UWB system in implementation four according to an embodiment of the present disclosure.
Figure 10:
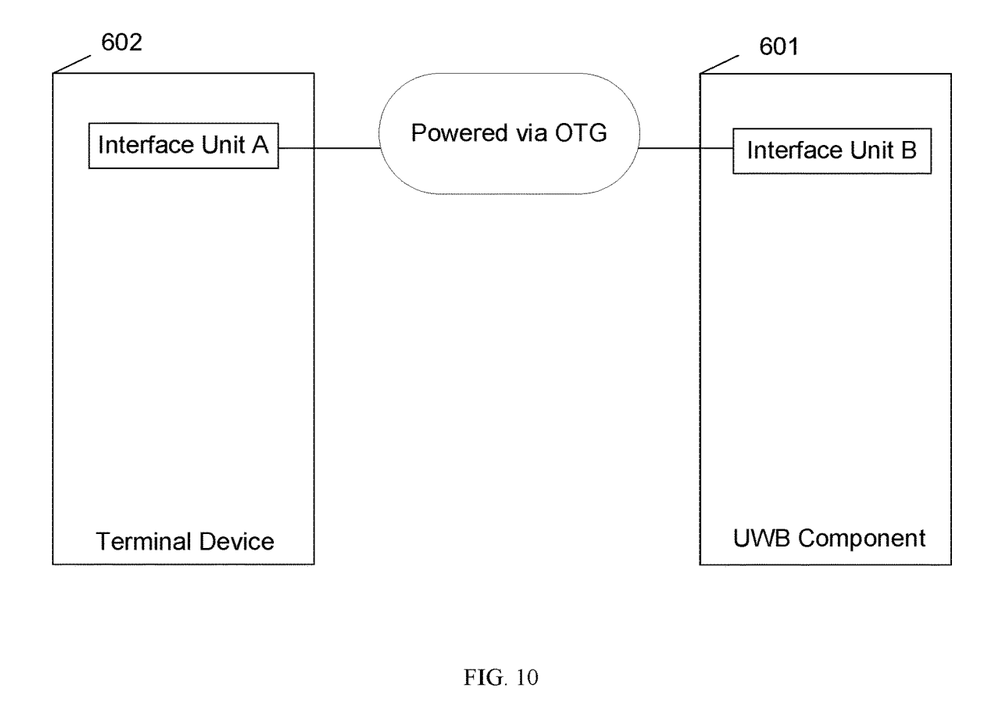
FIG. 10 depicts a schematic diagram showing a UWB system in implementation five according to an embodiment of the present disclosure.
Figure 11:
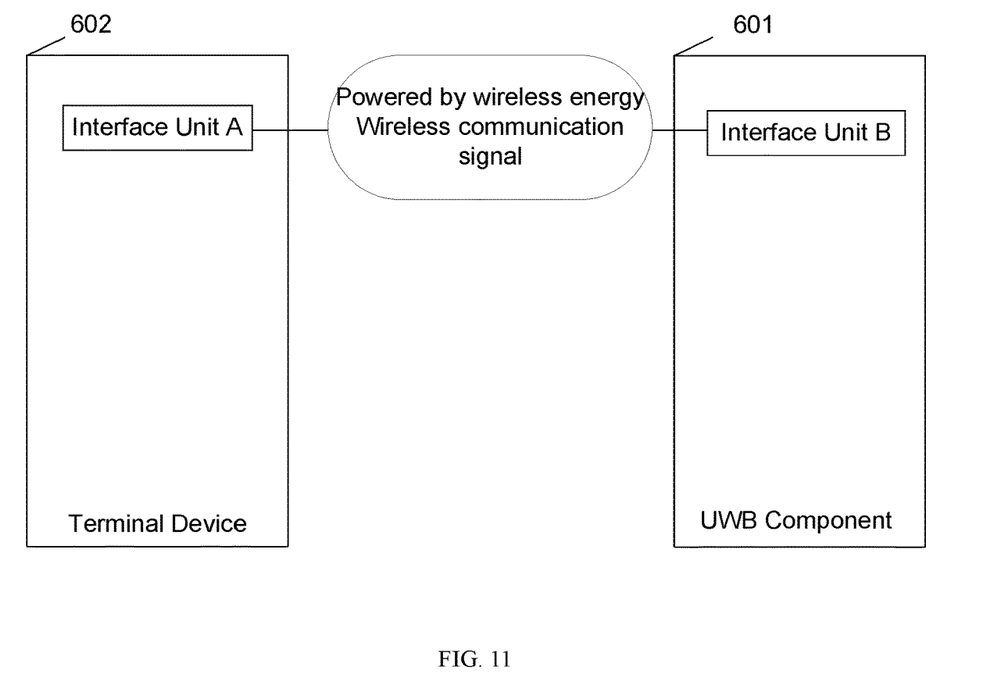
FIG. 11 depicts a schematic diagram showing a UWB system in implementation six according to an embodiment of the present disclosure.
Figure 12:
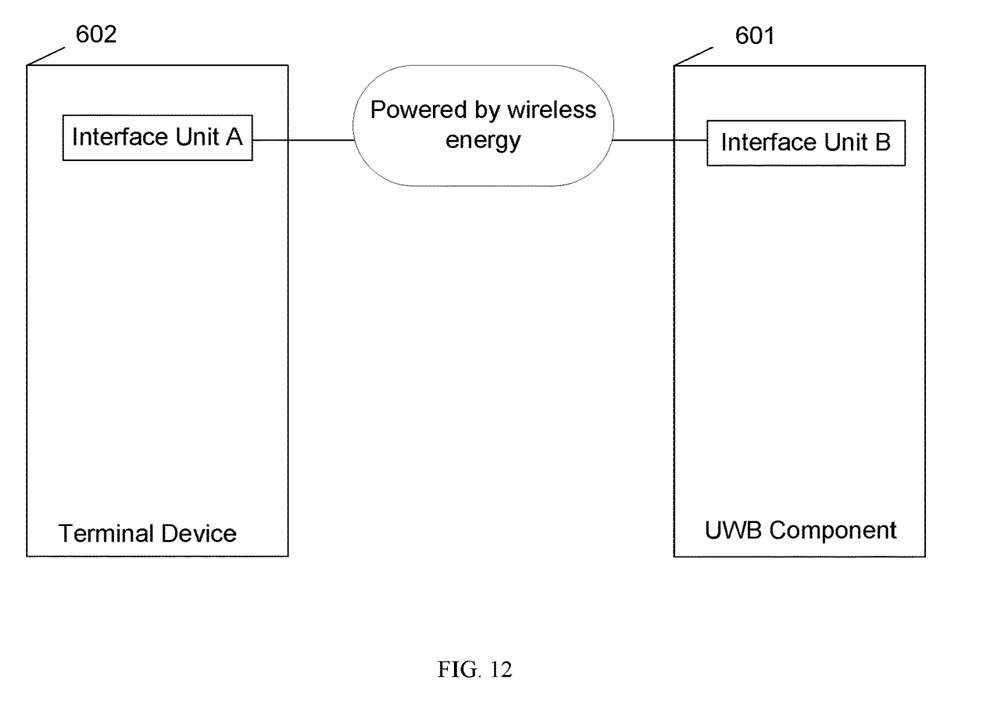
FIG. 12 depicts a schematic diagram showing a UWB system in implementation seven according to an embodiment of the present disclosure.

In an embodiment, the terminal device can provide a clock in two methods. In one method, the clock comes from an independent clock generator arranged within the terminal device. In the other method, the clock comes from the system clock provided by the smallest system of the terminal device. As shown in FIG. 6, the transmission transferred between interface unit A and interface unit B includes the clock signal provided by the terminal device.

In an embodiment, the clock signal can also be directly provided by an independent clock generator arranged within the UWB component, no clock signal presents in the transmission transferred by the interface unit A and the interface unit B, as shown in FIGS. 7 to 12.

Communication signals are intended for data interaction and control. The UWB component, if it is deployed as a UWB tag, belongs to a passive searching device, whose communication with the terminal device is not required. Power supply can be provided between interface unit A and interface unit B merely without communication signals. For example, referring to FIG. 8, FIG. 10, and FIG. 12, the transmission transferred between interface unit A and interface unit B does not contain a communication signal. If the UWB component is deployed as a UWB anchor, the UWB component has to communicate with the terminal device by transmitting information to the terminal device. The information is shown to the user or processed by the user. For example, refer to FIG. 6, FIG. 7, FIG. 9 and FIG. 11, the transmission transferred between interface unit A and interface unit B includes communication signals.

An embodiment of the present disclosure, a UWB component is provided, which can be deployed as a UWB tag and/or a UWB anchor. The UWB component is arranged externally to a terminal device. The UWB component is configured to transfer transmission to the terminal device through a first interface module. The transmission transferred between the UWB component and the terminal device includes any one or a combination of, a power supply voltage required by the UWB module, a clock signal, or a communication signal. By the arrangement of the UWB component external to the terminal devices, the devices for realizing the UWB functionalities (all devices for realizing the UWB functionalities or part of the devices for realizing the UWB functionalities) are arranged external to the terminal device. The transfer of the transmission such as the power supply voltage, communication signals, or clock signals are carried out through the first interface module. Due to the arrangement of all or part of the devices for realizing UWB functionalities external to the terminal device, the large footprint of the devices on the circuit board of the terminal device and the antennas can be addressed, and the mutual interference between antennas can be reduced. As a result, some high-end terminal devices with complex functions are allowed to be integrated with UWB functionalities, and the necessity for compromising some other functionalities for integration with the UWB functionalities is thus eliminated. At the same time, UWB components placed external to the terminal device can allow easier upgrading and replacement of UWB components. In addition, according to the trend in the industry that the peripheral ecological products on terminal devices are successively enriching, UWB component external to terminal devices can provide customers with a better user experience and more choices.

It is clear that the system described in this embodiment can be implemented in cooperation with the above-described embodiment(s) involving the UWB component and the above-described embodiment(s) involving the terminal device. The related technical details and technical effects mentioned in the embodiment(s) involving the UWB component and the embodiment(s) involving the terminal device is still applicable to the embodiment(s) involving the UWB system, so which will not be repeated here in order to reduce redundancy. Accordingly, the relevant technical details of the UWB system described in this embodiment are applicable to the above-described embodiment(s) involving UWB component or the above-described embodiment(s) involving the terminal device.

In various embodiments of the present disclosure, the following technical effects can be brought by the arrangement of all or part of the devices for realizing UWB functionalities external to the terminal device. The first is that, due to the arrangement of all or part of the devices for realizing UWB functionalities external to the terminal device, the large footprint of the devices on the circuit board of the terminal device and the antennas can be addressed, so that some high-end terminal devices with complex functions are allowed to be integrated with UWB functionalities, and the necessity for compromising some other functionalities for integration with the UWB functionalities is thus eliminated. Further, due to the external arrangement of the UWB antenna (one of the devices for realizing UWB functionalities) to the terminal device, the mutual interference between the UWB antenna, the 5G antenna, and the Wi-Fi antenna can be alleviated, and the antenna testing can be made easier. Moreover, the devices for realizing UWB functionalities arranged external to the terminal device can allow easier upgrading and replacement of UWB hardware. Lastly, according to the trend in the industry that the peripheral ecological products on terminal devices are successively enriching, all or part of the devices for realizing UWB functionalities external to terminal devices can provide customers with a better user experience and more choices.

It can be understood by those skilled in the art that the above-mentioned embodiments are examples for realizing the present disclosure, but in practical application, various changes can be made in form and details without departing from the scope of the present disclosure.

What is claimed is:

1. An ultra-wideband (UWB) component, arranged externally to a terminal device and deployed as at least one of, a UWB tag or a UWB anchor, the UWB component comprising:
   a first interface module; and
   a UWB module connected to the first interface module, the first interface module being arranged to be connected with the terminal device;
   wherein, the first interface module is configured to transfer a transmission between the terminal device and the UWB module, and the transmission comprises one or a combination of, a power supply voltage required by the UWB module, a clock signal, or a communication signal;
   wherein the UWB module comprises an electrically powered unit that is powered by a post-stage power supply unit; and
   wherein the post-stage power supply unit is arranged within the UWB component, the first interface module is connected with the post-stage power supply unit, the first interface module is configured to transmit a power supply voltage from the terminal device to the post-stage power supply unit, and the post-stage power supply unit is configured to regulate the power supply voltage and supply power to the electrically powered unit by means of the regulated power supply voltage.

2. The UWB component as claimed in claim 1, wherein the UWB module comprises an electrically powered unit, and a battery unit that is configured to supply power to the electrically powered unit;
   the UWB component further comprises a wireless energy receiving unit that is connected with the electrically powered unit;
   the transmission further comprises wireless energy, and the first interface module is configured to transmit the wireless energy transmitted by a wireless energy emitting unit arranged within the terminal device to the wireless energy receiving unit; and
   the wireless energy receiving unit is configured to charge the electrically powered unit by means of the received wireless energy.

3. The UWB component as claimed in claim 1, wherein the post-stage power supply unit comprises at least one of, a voltage converter (DC-DC), or a low dropout regulator (LDO).

4. The UWB component as claimed in claim 1, wherein the UWB module comprises a UWB chip and a microcontroller processor (MCU);
   the MCU is connected with the UWB chip, and the MCU is configured to convert output data from the UWB chip into standardized data meeting a preset standard, and transmit the standardized data to the terminal device through the first interface module.

5. The UWB component as claimed in claim 1, wherein the transmission comprises a clock signal that comes from a clock generator arranged within the terminal device, or from a system clock of the terminal device.

6. The UWB component as claimed in claim 1, wherein the UWB module comprises one of, a UWB chip, a UWB antenna unit, a microcontroller processor (MCU), a Bluetooth communication unit, a Bluetooth antenna unit, a clock unit, or a battery unit, or a combination thereof.

7. A terminal device, arranged external to the UWB component as claimed in claim 1, the terminal device comprising,
   a second interface module, arranged to be connected with the UWB component, and
   a UWB support module that is connected with the second interface module;
   wherein, the second interface module is configured to transfer a transmission between the UWB support module and the UWB component, and the transmission comprises one or a combination of, a power supply voltage required by the UWB component, a clock signal, or a communication signal.

8. The terminal device as claimed in claim 7, wherein the UWB support module comprises a wireless energy emitting unit that is connected with the second interface module; and
   the transmission further comprises wireless energy, the second interface module is configured to transmit the wireless energy emitted by the wireless energy emitting unit to a wireless energy receiving unit arranged within the UWB component, and the wireless energy receiving unit is configured to charge an electrically powered unit arranged within the UWB component by means of the received wireless energy.

9. The UWB component as claimed in claim 1, wherein the UWB module comprises a UWB chip and a microcontroller processor (MCU);
the MCU is connected with the UWB chip, and the MCU is configured to convert output data from the UWB chip into standardized data meeting a preset standard, and transmit the standardized data to the terminal device through the first interface module.

10. The terminal device as claimed in claim 7, wherein the UWB module comprises an electrically powered unit that is powered by a post-stage power supply unit; and
wherein, the post-stage power supply unit is arranged within the UWB component, the first interface module is connected with the post-stage power supply unit, the first interface module is configured to transmit a power supply voltage from the terminal device to the post-stage power supply unit, and the post-stage power supply unit is configured to regulate the power supply voltage and supply power to the electrically powered unit by means of the regulated power supply voltage.

11. The terminal device as claimed in claim 7, wherein the UWB module comprises an electrically powered unit that is powered by a post-stage power supply unit; and
wherein, the post-stage power supply unit is arranged within the terminal device, the first interface module is configured to transmit the regulated power supply voltage from the post-stage power supply unit within the terminal device to the electrically powered unit, so as to supply power to the electrically powered unit.

12. The terminal device as claimed in claim 7, wherein the UWB module comprises an electrically powered unit that is powered by a post-stage power supply unit; and
wherein, the post-stage power supply unit is configured to supply power via an On The Go (OTG) connection of the terminal device, the post-stage power supply unit comprises a first post-stage power supply subunit arranged within the terminal device, and a second post-stage power supply subunit arranged within the UWB component;
the first interface module is configured to transmit a power supply voltage stepped-up and regulated by the first post-stage power supply subunit to the second post-stage power supply subunit, and the second post-stage power supply subunit is configured to step-down and regulate the stepped-up and regulated power supply voltage, and supply power to the electrically powered unit through stepped-down and regulated power supply voltage.

13. An ultra-wideband (UWB) component, arranged externally to a terminal device and deployed as at least one of, a UWB tag or a UWB anchor, the UWB component comprising:
a first interface module; and
a UWB module connected to the first interface module, the first interface module being arranged to be connected with the terminal device;
wherein the first interface module is configured to transfer a transmission between the terminal device and the UWB module, and the transmission comprises one or a combination of, a power supply voltage required by the UWB module, a clock signal, or a communication signal;
wherein the UWB module comprises an electrically powered unit that is powered by a post-stage power supply unit; and
wherein, the post-stage power supply unit is arranged within the terminal device, the first interface module is configured to transmit the regulated power supply voltage from the post-stage power supply unit within the terminal device to the electrically powered unit, so as to supply power to the electrically powered unit.

14. The UWB component as claimed in claim 13, wherein the UWB module comprises a UWB chip and a microcontroller processor (MCU);
the MCU is connected with the UWB chip, and the MCU is configured to convert output data from the UWB chip into standardized data meeting a preset standard, and transmit the standardized data to the terminal device through the first interface module.

15. The UWB system as claimed in claim 13, wherein the UWB module comprises an electrically powered unit that is powered by a post-stage power supply unit; and
wherein, the post-stage power supply unit is arranged within the UWB component, the first interface module is connected with the post-stage power supply unit, the first interface module is configured to transmit a power supply voltage from the terminal device to the post-stage power supply unit, and the post-stage power supply unit is configured to regulate the power supply voltage and supply power to the electrically powered unit by means of the regulated power supply voltage.

16. The UWB system as claimed in claim 13, wherein the UWB module comprises an electrically powered unit that is powered by a post-stage power supply unit; and
wherein, the post-stage power supply unit is arranged within the terminal device, the first interface module is configured to transmit the regulated power supply voltage from the post-stage power supply unit within the terminal device to the electrically powered unit, so as to supply power to the electrically powered unit.

17. An ultra-wideband (UWB) component, arranged externally to a terminal device and deployed as at least one of, a UWB tag or a UWB anchor, the UWB component comprising:
a first interface module; and
a UWB module connected to the first interface module, the first interface module being arranged to be connected with the terminal device;
wherein, the first interface module is configured to transfer a transmission between the terminal device and the UWB module, and the transmission comprises one or a combination of, a power supply voltage required by the UWB module, a clock signal, or a communication signal;
wherein the UWB module comprises an electrically powered unit that is powered by a post-stage power supply unit; and
wherein, the post-stage power supply unit is configured to supply power via an On The Go (OTG) connection of the terminal device, the post-stage power supply unit comprises a first post-stage power supply subunit arranged within the terminal device, and a second post-stage power supply subunit arranged within the UWB component;
the first interface module is configured to transmit a power supply voltage stepped-up and regulated by the first post-stage power supply subunit to the second post-stage power supply subunit, and the second post-stage power supply subunit is configured to step-down and regulate the stepped-up and regulated power supply voltage, and supply power to the electrically powered unit through stepped-down and regulated power supply voltage.

18. The UWB component as claimed in claim 17, wherein the UWB module comprises a UWB chip and a microcontroller processor (MCU);
the MCU is connected with the UWB chip, and the MCU is configured to convert output data from the UWB chip into standardized data meeting a preset standard, and transmit the standardized data to the terminal device through the first interface module.

* * * * *